(12) United States Patent
Van Schie et al.

(10) Patent No.: US 9,132,368 B2
(45) Date of Patent: Sep. 15, 2015

(54) FILTER DEVICE FOR SEPARATING A MIXTURE OF SOLID SUBSTANCE AND A LIQUID

(75) Inventors: Louis Van Schie, Vlijmen (NL); Marinus Arnoldus Wilhelmus Maria Van Hulten, Drunen (NL)

(73) Assignee: LOMAPRO B. V., Vlijmen (NL)

( * ) Notice: Subject to any disclaimer, the term of this patent is extended or adjusted under 35 U.S.C. 154(b) by 664 days.

(21) Appl. No.: 13/577,080

(22) PCT Filed: Feb. 3, 2011

(86) PCT No.: PCT/NL2011/050072
§ 371 (c)(1),
(2), (4) Date: Oct. 17, 2012

(87) PCT Pub. No.: WO2011/096802
PCT Pub. Date: Aug. 11, 2011

(65) Prior Publication Data
US 2013/0199973 A1    Aug. 8, 2013

(30) Foreign Application Priority Data
Feb. 5, 2010  (NL) .................................. 2004197

(51) Int. Cl.
*B01D 33/04*    (2006.01)
*B01D 29/09*    (2006.01)

(52) U.S. Cl.
CPC ............. *B01D 33/04* (2013.01); *B01D 29/09* (2013.01); *B01D 29/096* (2013.01)

(58) Field of Classification Search
None
See application file for complete search history.

(56) References Cited

U.S. PATENT DOCUMENTS

| 1,958,279 | A | * | 5/1934 | Morgan | ....................... 100/152 |
| 4,057,437 | A |   | 11/1977 | Kracklauer | |
| 4,681,679 | A |   | 7/1987 | Reber | |

FOREIGN PATENT DOCUMENTS

| DE | 7218709 | 8/1972 |
| GB | 1080878 | 8/1967 |
| NL | 7705275 | 5/1977 |

* cited by examiner

*Primary Examiner* — Terry Cecil
(74) *Attorney, Agent, or Firm* — The Webb Law Firm (57) ABSTRACT

The manner in which a liquid filtration in which a liquid is separated from a solid substance by means of a filter can be best realized generally depends on the specific conditions. The invention relates to a filter device for separating a mixture of solid substance and a liquid.

27 Claims, 6 Drawing Sheets

FILTER DEVICE FOR SEPARATING A MIXTURE OF SOLID SUBSTANCE AND A LIQUID

BACKGROUND OF THE INVENTION

1. Field of the Invention

The invention relates to a filter device for separating a mixture of solid substance and a liquid.

2. Description of Related Art

The manner in which a liquid filtration in which a liquid is separated from a solid substance by means of a filter can be best realized generally depends on the specific conditions. If it is wished to at least partially remove solid constituents from relatively large bulk quantities of liquid, it is usually advantageous to carry out (semi-)continuous liquid filtration by applying a filter device which is provided with a filter belt, wherein the filter belt forms an elongate (belt-like or strip-like) filter cloth for separating liquid and solid constituents. The advantage of applying such a filter device is that the filter belt is displaced through the filter device during the filtration process, whereby the part of the filter belt effectively used for filtering is in fact periodically changed, wherein the already used, contaminated part of the filter belt can be removed from the filter device. Transport of the filter cloth through the filter device generally takes place by pulling the cloth by making use of a conveyor belt, such as a chain or rubber belt, or by making use of a wheel, using which the filter cloth can be pushed forward. The known transport techniques all have drawbacks however. Pulling the cloth will result relatively quickly in tearing of the filter cloth, particularly in the case the filter cloth is not displaced homogeneously through the filter device, and this will generally result in leakage and thereby malfunction of the filter device. Pushing the filter cloth forward using a rotating wheel has the drawback that this method of displacement can result relatively quickly in slippage between the filter cloth and the rotating wheel, which will hamper and may even prevent displacement of the filter cloth. The forward pushing can moreover generally also result relatively easily in creasing of the filter cloth, this resulting in leakage and therefore malfunction of the filter device. The use of a separate conveyor belt such as a chain is in general structurally relatively complex and therefore generally entails relatively high production costs and operational costs. A drawback of the separate conveyor belt is moreover that a sealing of the filter cloth in the filter device can be relatively difficult to realize, which results in undesirable leakage in the filter device. A further drawback is that in the known filter device a plurality of electric motors, or at least a plurality of drives, are generally applied, which must be continuously mutually synchronized in order to prevent rucking or tearing of the filter cloth, which is found in practice to be exceptionally difficult.

An object of the invention is to provide an improved filter device for separating a mixture.

SUMMARY OF THE INVENTION

The invention provides for this purpose a filter device comprising: a first compartment adapted to hold a mixture of solid substance and a liquid, a second compartment positioned at least partially under the first compartment for collecting liquid coming from the first compartment, a stationary open support structure which separates the first compartment and the second compartment and which is adapted to support a filter belt displaceable through the first compartment, at least one axially rotatable first transport element which engages on the support structure and which is adapted for pushing displacement of the filter belt from a feed side of the support structure in the direction of a discharge side of the support structure by means of rotating the first transport element and by clamping the filter belt between the first transport element and the support structure, at least one axially rotatable second transport element which engages on the first transport element and co-acts with the first transport element, and which is adapted for pulling displacement of the filter belt from the feed side of the support structure in the direction of the discharge side of the support structure by means of rotating the second transport element and by clamping the filter belt between the first transport element and the second transport element, and at least one drive element coupled to at least one transport element for causing axial rotation of the transport elements. Because at least one first transport element and at least one second transport element are applied in the filter device according to the invention which—with interposing of the filter belt—engage each other (under bias) and co-act directly with each other, axial rotation of the first transport element will therefore result in an axial rotation of the second transport element, and vice versa. This has the advantage that displacement of the filter belt through the filter device takes place by simultaneously pushing the filter belt forward over the support structure by clamping the filter belt between the first transport element, set into rotation by the drive element, and the stationary support structure, and pulling the filter belt by clamping the filter belt between the first transport element, set into rotation by the drive element, and the second transport element set into (counter-)rotation by the first transport element. As a result of this pulling force the filter belt is pulled through the first compartment, so in fact from the feed side of the support structure, where the filter belt is guided into the first compartment, to the discharge side of the support structure where the filter belt is guided out of the first compartment. The second transport element will generally be positioned here at or at least close to the discharge side of the support structure. This simultaneously active but separate push-pull movement realized by the transport elements has the advantage that the filter belt can be displaced in relatively controlled and reliable manner over the support structure of the filter device, this enhancing as such the operation and reliability of the filter device. In the case of slippage of the filter belt relative to the first transport element, the pulling force realized using the second transport element will be sufficiently great to continue displacing the filter belt relative to the support structure and therefore allow compensation of the slipping effect. In operational mode the first transport element will in fact engage on the support structure via the filter belt. This (indirect) engagement will take place under bias, whereby a certain fixation of the filter belt relative to the first transport element is realized, this preventing slippage of the filter belt relative to the first transport element. Because—generally a longitudinal edge of—the filter belt is pressed against the support structure by the first transport element, particularly from or close to the feed side up to or close to the discharge side of the support structure, liquid present in the first compartment can substantially only be displaced through the filter belt to the second compartment, this generally enhancing the filtering efficiency. The filter belt can form an endless filter belt, wherein the filter cloth (re)circulates continuously in the filter device. The filter belt will however generally form a finite strip of filter cloth guided as a batch through the first compartment. After use of the filter belt, the filter belt will generally be discarded.

The co-action between the first transport element and the second transport element is a direct and generally mechanical co-action irrespective of the presence or the displacement of the filter belt. This direct co-action can be realized by having a peripheral side of the first transport element engage on a peripheral side of the second transport element. In operational mode the second transport element will generally engage under bias on the first transport element via the filter belt, whereby the filter belt is clamped between the first transport element and the second transport element sufficiently tightly to enable a pulling force to be exerted on the filter belt. In this embodiment the peripheral speeds of the first transport element and the second transport element will be the same, whereby a smooth push-pull movement can be realized. It is also possible to envisage co-action of the second transport element with the first transport element via one or more transmission elements. Examples of transmission elements are toothed wheels, rollers, chains and belts. Using these transmission elements the peripheral speed of the second transport element can also be manipulated relative to the first transport element. It is thus possible to envisage having for instance the second transport element rotate at a (slightly) higher peripheral speed than the first transport element, whereby the pulling force that is realized is greater than the pushing force that is realized, which results in a certain tensioning of the filter belt in the filter device, which can further counteract crease formation in the filter belt in the first compartment.

It is not otherwise necessary to realize the pulling force (only) by clamping the filter belt between the first transport element and the second transport element. It is for instance also possible to envisage the pulling force being realized by the second transport element as such, for instance by embodying the second transport element with profiled, in particular conical piercing elements, wherein the piercing elements can perforate the filter belt and can in this way pull the filter belt in the direction of the discharge side of the support structure. It is also possible to envisage the pulling movement being realized by co-action of the second transport element with another transport element, such as at least one first transport element and/or at least one axially rotatable third transport element, between which the filter belt can be clamped. It is particularly advantageous here for the at least one second transport element to be adapted for co-action with one or more axially rotatable third transport elements, wherein each third transport element engages under bias on the second transport element to enable the filter belt to be pulled forward due to clamping of the filter belt. The degree of bias can be regulated here, for instance by applying a spring mechanism. By also having the one or more third transport elements engage on at least one centrally located part of the filter belt, around the centre line of the filter belt, the displacement speed over the width of the filter belt can be kept substantially constant, whereby creasing and rucking of the filter belt can be prevented as far as possible.

It is usually advantageous for the peripheral side of the first transport element to be provided with a substantially flexible liquid-sealing material, such as for instance neoprene. By applying such a peripheral seal a substantially liquid-tight seal can be realized in relatively efficient manner between the first transport element, the filter belt and the support structure, without herein damaging the first transport element, the filter belt and/or the support structure. As already stated, such a substantially liquid-tight seal is desirable for the purpose of preventing as far as possible liquid displacement along the filter belt instead of through the filter belt.

In an advantageous embodiment the filter device comprises a plurality of first transport elements which are oriented co-axially of each other, wherein at least two transport elements are adapted to engage on or close to opposite longitudinal edges of the filter belt. By having different first transport elements engage (close to) the longitudinal edges of the filter belt a relatively good and reliable longitudinal sealing of the part of the filter belt situated in the first compartment can generally be realized; this generally enhancing the filtering action of the filter device. It is advantageous here for the support structure to be adapted to at least support at least the opposite longitudinal edges of the filter belt. The plurality of first transport elements are preferably mutually connected here, particularly by means of a central shaft, whereby the peripheral speeds of the first transport elements are identical, which enhances a homogeneous throughfeed of the filter belt through the first compartment.

The first transport element is preferably formed by an axially rotatable transport wheel with a circular cross-section. The second transport element is generally formed by a guide roller. It is advantageous here for the width of the second transport element to be greater than or equal to the width of the filter belt; this facilitating homogenous guiding of the filter belt. Possible one or more third transport elements are preferably embodied as running wheels which can exert a bias on the guide roller. In an advantageous embodiment the diameter of a part of the guide roller engaging on the first transport element is smaller than the diameter of a part of the guide roller lying at a distance from the first transport element. The narrowed parts of the guide roller are thus adapted here for co-action with the first transport element, and generally also for clamping of the filter belt. By having the diameter vary over the length of the guide roller the local (location-selective) peripheral speed of the guide roller can also be varied and regulated.

Increasing the peripheral speed produces a stronger pulling effect. If the peripheral speed of a location-selective part of the guide roller has a higher peripheral speed than the peripheral speed of the first transport element, the pulling force exerted on the filter belt will be greater than the pushing force exerted on the filter belt, whereby rucking of the filter belt can be prevented to further extent. A centrally located part of the guide roller can optionally be provided with an increased diameter in order to further increase the local peripheral speed, whereby the generally critical central part of the filter belt is also pulled forward smoothly and easily.

The drive element will generally be coupled to only a single (type of) transport element. This means that the drive element is coupled to the at least one first transport element or coupled to the at least one second transport element. Only one transport element is hereby driven directly by the drive element, and the other transport element co-acting with this transport element will be driven indirectly by the drive element. The drive element is preferably coupled (only) to the at least one first transport element, because this first transport element is generally the most difficult to drive because of the relatively great friction forces generally present between the first transport element and the support structure. An electric motor is preferably applied as drive element for rotating the transport elements. The electric motor will generally be directly coupled here to the at least one first transport element, via which first transport element the second transport element and optionally the third (and possible further) transport element will be driven. It is also possible to envisage driving the transport elements manually or hydraulically and/or pneumatically instead of using an electric motor.

Because the one or more first transport elements applied in the filter device according to the invention generally take a substantially round cross-sectional form, it is advantageous when the support structure can connect in substantially form-fitting manner to the peripheral side of the first transport elements. It is therefore advantageous for the support structure to take a curved, in particular semi-circular form.

The support structure takes a stationary form, this meaning that the support structure does not in fact move and is thus stationary. Furthermore, the support structure generally takes a substantially rigid (form-retaining) form and can for instance be manufactured here from metal or plastic. The support structure can optionally be received and/or mounted releasably in the filter device. The advantage of applying such a support structure is that it enables a good sealing between the first transport element and the support structure. Such a seal is generally deemed to be of great importance in preventing unfiltered substance being able to displace alongside the filter belt from the first compartment to the second compartment, and so not being filtered. Such a seal is moreover advantageous when it is desirable to create an underpressure in the second compartment, since drawing in false air from the first compartment around the outer sides of the filter belt can in this way be prevented.

In an embodiment the support structure is embodied as a substantially rigid perforated plate. Although this plate can take a substantially flat form, the plate preferably takes a curved form in order to enable substantially form-fitting connection to the at least one first transport element. In an advantageous embodiment at least some of the number of perforations arranged in the plate take an elongate form in the direction of displacement of the filter belt to be displaced over the plate. Such an orientation of the perforations generally results in a reduced resistance than if the perforations were for instance positioned transversely of the direction of displacement of the filter belt. An upper side of the perforations arranged in the plate and facing toward the filter belt is preferably defined by a rounded edge so that the resistance to the filter belt to be displaced over the support structure can be kept as low as possible without detracting from the support of the filter belt by the support structure. The perforations are however preferably arranged such that the filter belt covers the perforations in operational mode so that leakage of liquid around the outer sides of the filter belt from the first compartment to the second compartment can be prevented as far as possible.

In an embodiment the second compartment comprises at least one first suction element, in particular a pump, for suctioning filtered water from the second compartment, whereby the second compartment can be prevented as far as possible from being filled with filtered liquid. It is possible here to envisage the second compartment taking a substantially closed form, except for an upper side directed toward the support structure, such that an underpressure is created in the second compartment by suctioning filtered water out of the second compartment using the suction element. It will however be generally advantageous here to have a second suction element connect to the second compartment for the purpose of creating an underpressure by suctioning air out of the second compartment. Owing to this underpressure liquid situated in the first compartment will be pulled with force through the filter belt, whereby the filtering process can be realized more quickly and with a higher efficiency (amount of filtered solid constituents per surface area of filter belt).

The filter device preferably comprises at least one level sensor for detecting the liquid level in the first compartment and/or the second compartment. In this way information can be obtained about the degree of filling of the first compartment and/or the second compartment, and thereby about the functioning of the filter device and the efficiency of the filtering process. In a particular embodiment the level sensor is coupled to the suction element via a control unit. The control unit is programmed here such that the suction element is activated when the liquid level detected by the level sensor exceeds a predefined value.

The filter device will generally comprise at least one dispensing element for dispensing mixture to the first compartment. The dispensing element can be of diverse nature here and is generally positioned above the first compartment, whereby the mixture can in fact be poured into the first compartment.

Although an endless filter belt could be applied, the filter belt will generally be formed by a (finite) strip of filter cloth. The filter device therefore generally comprises at least one supply holder for unused filter belt positioned close to the feed side of the support structure. The supply holder can for instance be formed by an axially rotatable roll of unused filter cloth. A collecting vessel for used filter belt is generally positioned on an opposite side of the filter device, close to the discharge side of the support structure. It is also possible to envisage rolling up the used filter belt.

Although the filter device according to the invention can be made commercially available without filter belt, it is also possible to envisage the available filter device already being provided with the filter belt. Use of the filter belt is of course necessary however for operational use. An example of a suitable filter belt is a polyester cloth with a pore size of 40 micrometres.

BRIEF DESCRIPTION OF THE DRAWINGS

The invention will be further elucidated with reference to non-limitative exemplary embodiments shown in the following figures. Herein.

DETAILED DESCRIPTION OF THE PREFERRED EMBODIMENTS

Figure 1:
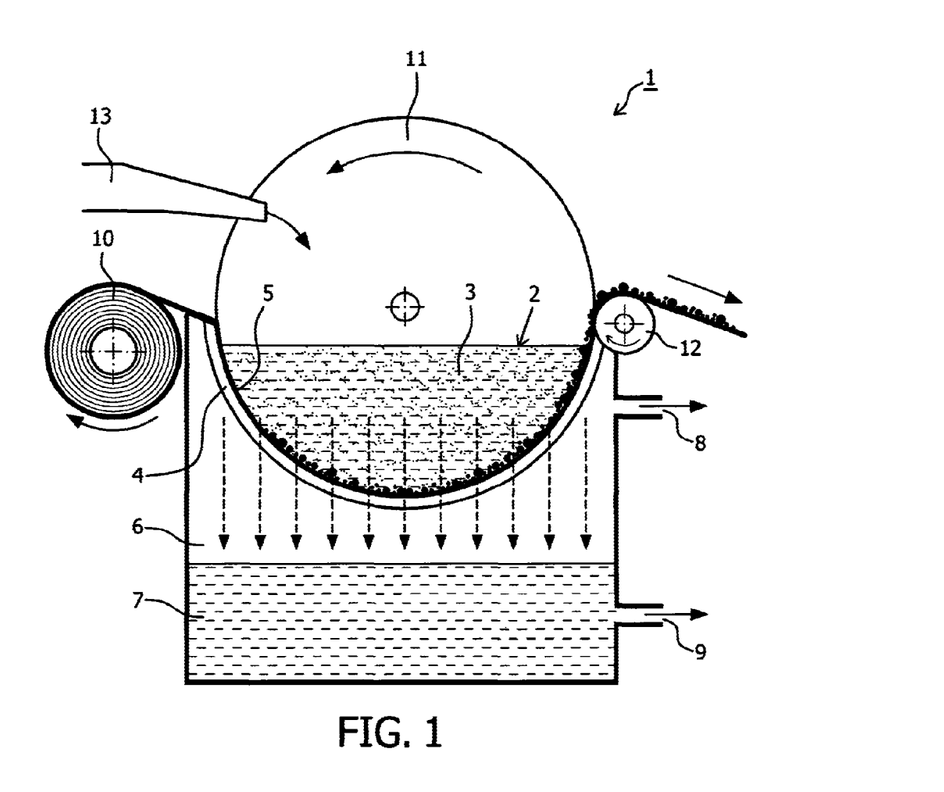
FIG. 1 is a schematic side view of a filter device according to the invention.

FIG. 1 is a schematic side view of a filter device 1 according to the invention. Filter device 1 comprises a first compartment 2 for holding water 3 contaminated with solid constituents, such as for instance sand or sludge. The contaminated water 3 is carried into first compartment 2 via a feed 13. An underside of first compartment 2 is bounded by a perforated, semi-circular plate 4. Plate 4 is adapted on the one hand to allow through water, and adapted on the other to carry a displaceable belt-like filter cloth 5, also referred to as a filter belt. Filter cloth 5 is adapted to filter contaminated water 3 while water 3 sinks through filter cloth 5 to a second compartment 6 which is positioned under first compartment 2 and in which the filtered water 7 at least partially separated from the solid constituents will be collected. Displacement of water from first compartment 2 to the second compartment will take place under the influence of gravitational force and can optionally be forced by activating a vacuum pump 8 connecting to second compartment 6. The filtered water 7 collected in second compartment 6 can be discharged from second compartment 6 via a separate pump 9. Filter device 1 also comprises an axially rotatable supply holder 10 for filter cloth 5. By unrolling filter cloth 5 from supply holder 10 and displacing filter cloth 5 through first compartment 2 the effectively used filter cloth 5 can be changed, whereby relatively large quantities of contaminated liquid 3 can be filtered. Displacement of filter cloth 5 through first compartment 2 takes place in advantageous manner by simultaneously exerting a forward pushing force as well as a pulling force on filter cloth 5 in a direction of filter device 1 away from supply holder 10. Filter device 1 comprises for this purpose one or more rotatable transport wheels 11 which, with interposing of filter cloth 5, engage in substantially form-fitting manner and under bias on curved plate 4. Because the one or more transport wheels 11 engage under bias on curved plate 4 via filter cloth 5, filter cloth 5 will be clamped between each transport wheel 11 and plate 4, which results during rotation of the one or more transport wheels 11 in a forward pushing force being exerted on filter cloth 5. The pulling force is realized by mechanical co-action of an axially rotatable guide roller 12 with the one or more transport wheels 11, between which filter cloth 5 is clamped and displaced. The combined forward pushing force and pulling force result in a relatively reliable and controlled displacement of filter cloth 5 through first compartment 2. The used filter cloth 5 guided out of first compartment 2 will be collected and, after filter cloth 5 has been fully fed through first compartment 2, filter cloth 5 will be deemed waste or cleaned and optionally reused.

Figure 2A:
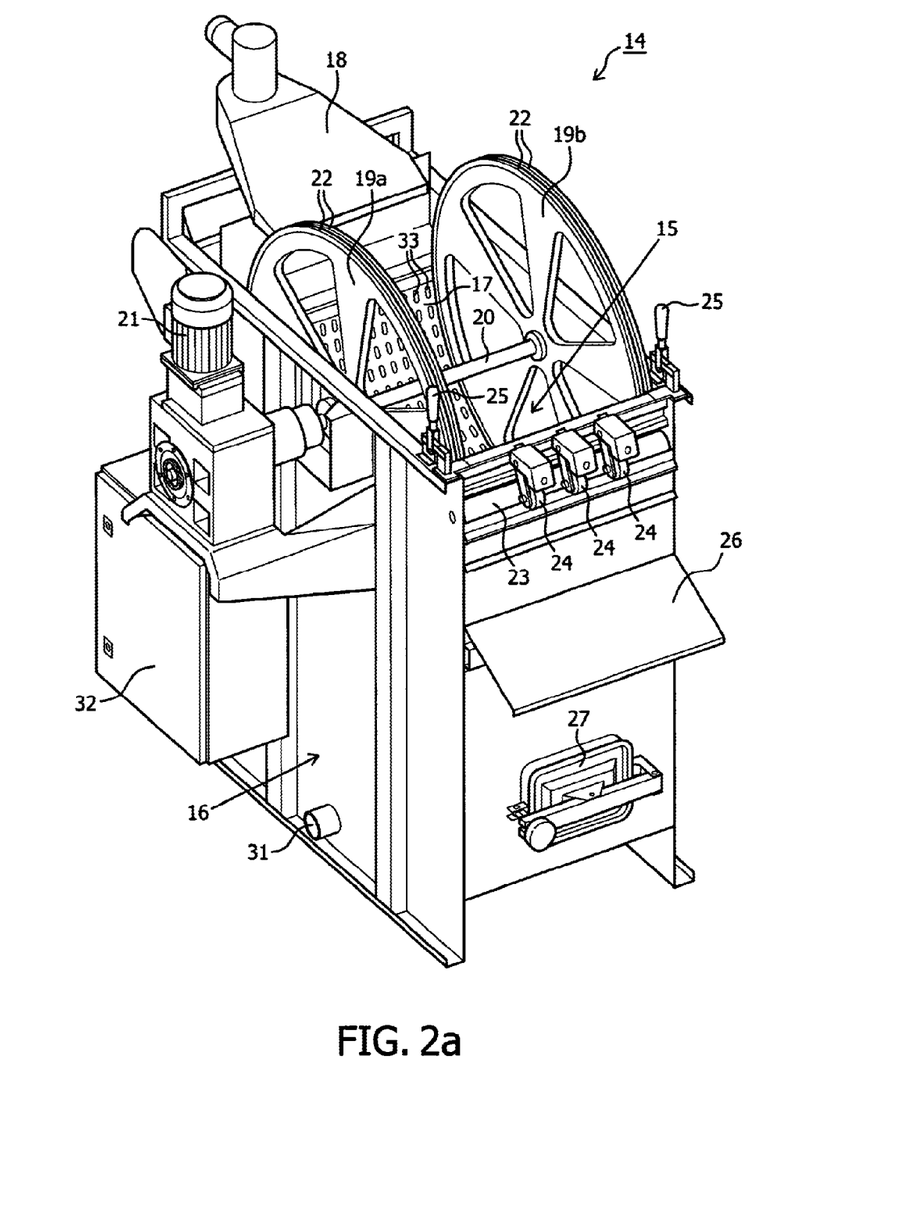
FIG. 2a is a perspective view of another filter device according to the invention.
Figure 2B:
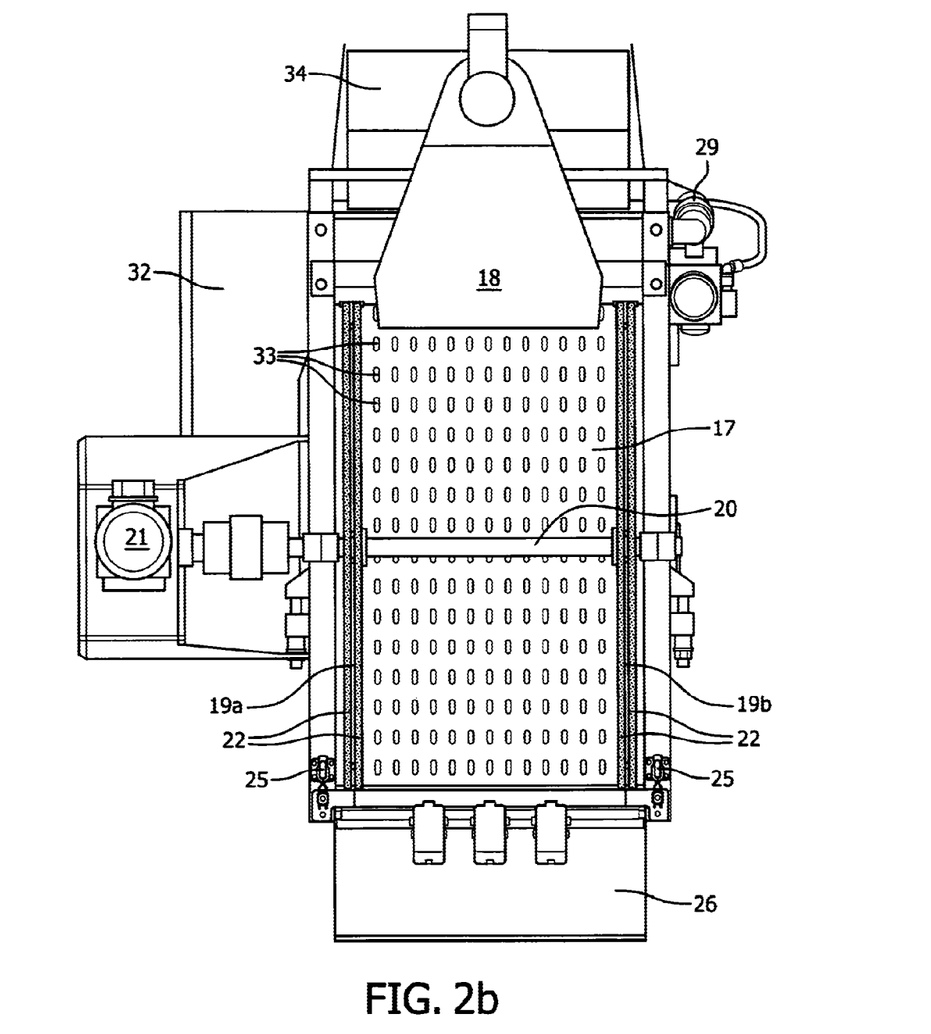
FIG. 2b is a top view of the filter device according to FIG. 2a, FIG. 2c shows a cross-section of the filter device according to FIG. 2a, FIGS. 3a-3c are schematic views of respective filter devices according to the invention.
Figure 2C:
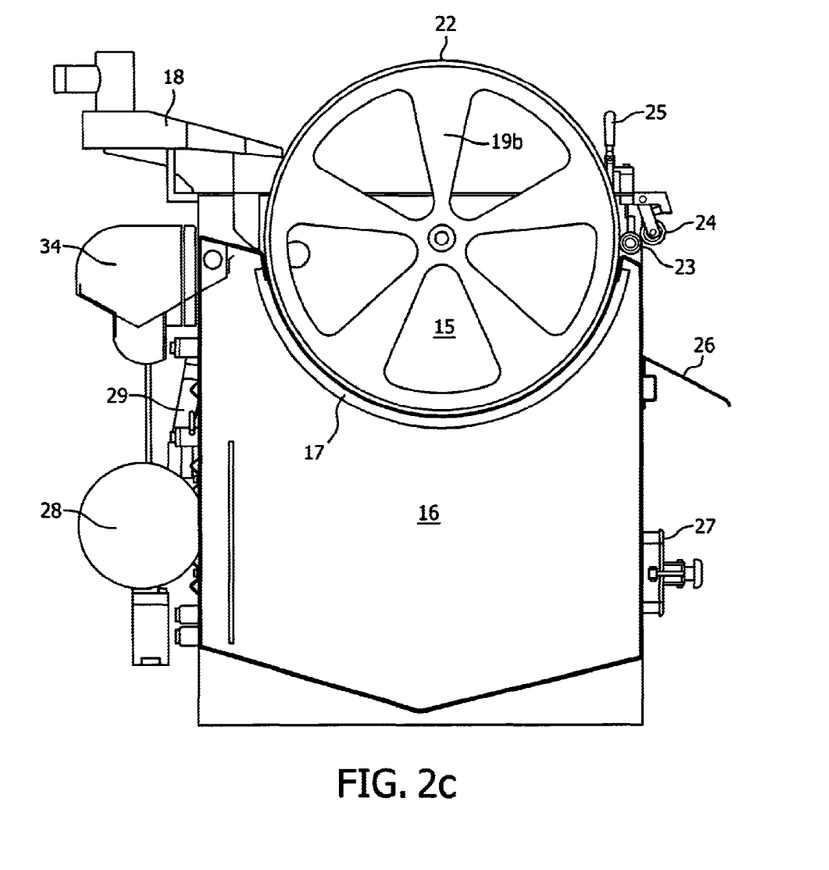

FIG. 2a is a perspective view of another filter device 14 according to the invention. The filter device 14 shown in FIG. 2a substantially corresponds structurally to filter device 1 shown schematically in FIG. 1. The filter belt applied is not shown however in FIG. 2. Filter device 14 comprises a first compartment 15 which functions as upper chamber, under which is arranged a second compartment 16 (see FIG. 2c) which functions as lower chamber. The two compartments 15, 16 are mutually separated by means of a perforated, semicircular plate 17 over which (a part of) the filter belt is arranged in operational mode. A mixture of solid constituents in water can be carried into first compartment 15 via a feed 18. Under the influence of gravitational force the water will displace through the filter belt and supporting plate 17 to the second compartment, while at least a fraction of the solid constituents will be deposited on the filter belt. The part of the filter belt effectively used for filtering can be changed by displacing the filter belt relative to plate 17. In order to displace the filter belt through first compartment 15, filter device 14 comprises two axially rotatable transport wheels 19a, 19b which are mutually connected by means of a central shaft 20. Central shaft 20 is coupled to an electric motor 21 for the purpose of rotating transport wheels 19a, 19b. A peripheral side of each transport wheel 19a, 19b is provided with two elastic bands 22 which are positioned adjacently of each other and via which transport wheels 19a, 19b engage under bias on plate 17. In operational mode the longitudinal edges of the filter belt will be clamped between transport wheels 19a, 19b on the one hand and plate 17 on the other. The filter belt will be pushed forward by elastic bands 22 due to rotation of transport wheels 19a, 19b. In addition to this forward pushing force, a pulling force is also exerted on the filter belt in the same direction by causing transport wheels 19a, 19b to co-act with a first guide roller 23, wherein first guide roller 23 also co-acts with three second guide rollers 24. A pulling force can be exerted on the filter belt by clamping the filter belt between transport wheels 19a, 19b on the one hand and first guide roller 23 on the other, and between first guide roller 23 on the one hand and second guide rollers 24 on the other. This combined push-pull movement results in a displacement of the filter belt through first compartment 15 which is not susceptible to slippage, and which is therefore controlled and reliable. Second guide rollers 24 can be removed from first guide roller 23 by means of handles 25. A baffle 26 is positioned under guide rollers 23, 24 for guiding a (contaminated) part of the filter belt which has already been guided through first compartment 15. Positioned under partition 26 is a closed access door 27 for gaining access to second compartment 16. The cross-section as shown in FIG. 2c further shows that a vacuum pump 28 connects via a suction line 29 to second compartment 16 for the purpose of suctioning air out of second compartment 16. An underpressure can in this way be created in second compartment 16, as a result of which the water to be filtered can be drawn through the filter belt in forced (accelerated) manner. Suctioning of filtered water out of second compartment 16 takes place by means of a pump (not shown) which is arranged on a suction opening 31 arranged in second compartment 16. Displacement of the filter belt will generally take place discontinuously and in this exemplary embodiment depend on a time-related parameter and a liquid level detected in first compartment 15. The control of filter device 14 is realized using a control unit 32. As is visible, a part of the plate located between transport wheels 19a, 19b is provided with a plurality of elongate perforations 33 which are oriented in the direction of displacement of the filter belt in order to limit the resistance of the filter belt during displacement. A supply holder 34 for a roll of filter belt (not shown) is positioned above vacuum pump 28.

Figure 3A:
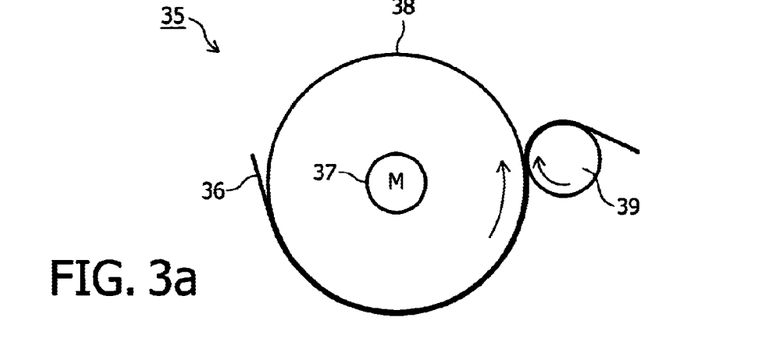

FIG. 3a is a schematic side view of a filter device 35 according to the invention, which only shows that a filter belt 36 is guided/tensioned round a part of an axially rotatable first transport element 38 driven by a motor 37 and is clamped between first transport element 38 and an axially rotatable second transport element 39 which, with interposing of filter belt 36, engages on first transport element 38. Because filter belt 36 is entrained by first transport element 38 a pushing movement results. Because the indirectly driven second transport element 39 co-acts with first transport element 38 and clamps filter belt 36, a simultaneous pulling movement occurs on a discharge side of filter device 35, whereby filter belt 36 can be pulled relatively smoothly through filter device 35.

Figure 3B:
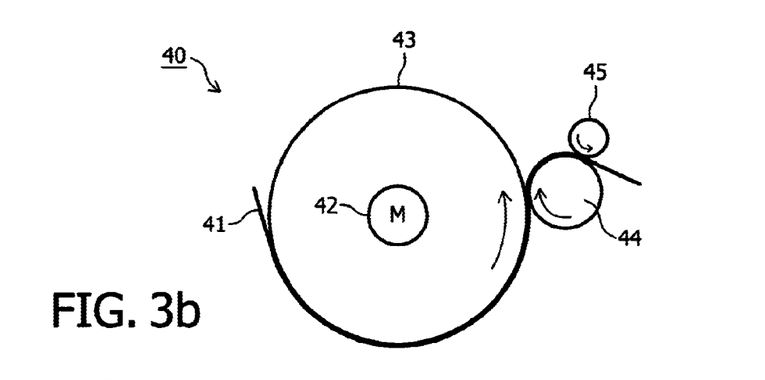

FIG. 3b is a schematic side view of another, similar filter device 40 according to the invention, which also shows that a filter belt 41 is guided/tensioned round a part of an axially rotatable first transport element 43 driven by a motor 42 and is clamped between first transport element 43 and an axially rotatable second transport element 44 which, with interposing of filter belt 41, engages on first transport element 43. Filter device 40 further comprises a third transport element 45 which engages under bias, with interposing of filter belt 41, on second transport element 44. Because filter belt 41 is entrained by first transport element 43 a pushing movement occurs. Because the indirectly driven second transport element 44 co-acts with first transport element 43 and clamps filter belt 41, a simultaneous pulling movement results on a discharge side of filter device 40. Due to the co-action between second transport element 44 and third transport element 45, thus clamping filter belt 41, an additional pulling force is moreover exerted on filter belt 41, whereby filter belt 41 can be pulled relatively smoothly through filter device 40.

Figure 3C:
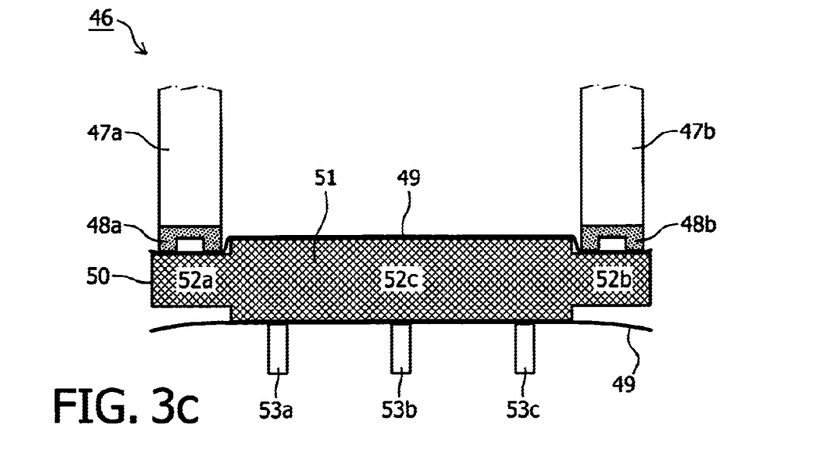

FIG. 3c is a schematic detail view of a part of a filter device 46 according to the invention. It is possible here to envisage that the filter device 46 shown in this figure is the filter device 40 according to FIG. 3b. Filter device 46 comprises two (partially shown) first transport elements 47a, 47b which are rigidly coupled to each other. Transport elements 47a, 47b, in fact formed by wheels, are rotated axially using a motor (not shown). A peripheral side of each transport element 47a, 47b is provided with a seal 48a, 48b. By applying this seal 48a, 48b the first transport elements 47a, 47b can engage under bias—with interposing of a filter belt 49—on a stationary screen plate (not shown) and an axially rotatable guide roller 50 functioning as second transport element. An external side 51 of the guide roller takes a profiled form in order to improve reliable engagement on filter belt 49. The two outer ends 52a, 52b of guide roller 50 take a narrowed form and thereby have a smaller diameter than a central part 52c of guide roller 50. The result hereof is that central part 52c of guide roller 50 has a higher peripheral speed than outer ends 52a, 52b. Because three third transport elements 53a, 53b, 53c, formed in fact by wheels, engage under bias—with interposing of filter belt 49—n central part 52 of guide roller 50, a greater pulling force can be exerted on the central part of filter belt 49 than on the longitudinal edges of filter belt 49, whereby crease formation in filter belt 49 can be prevented as far as possible. Filter belt 49 is engaged by first transport elements 47a, 47b, guide roller 50 and third transport elements 53a, 53b, 53c as shown in FIG. 3b, whereby a simultaneous push-pull-pull movement is also realized in this filter device 46.

Figure 4:
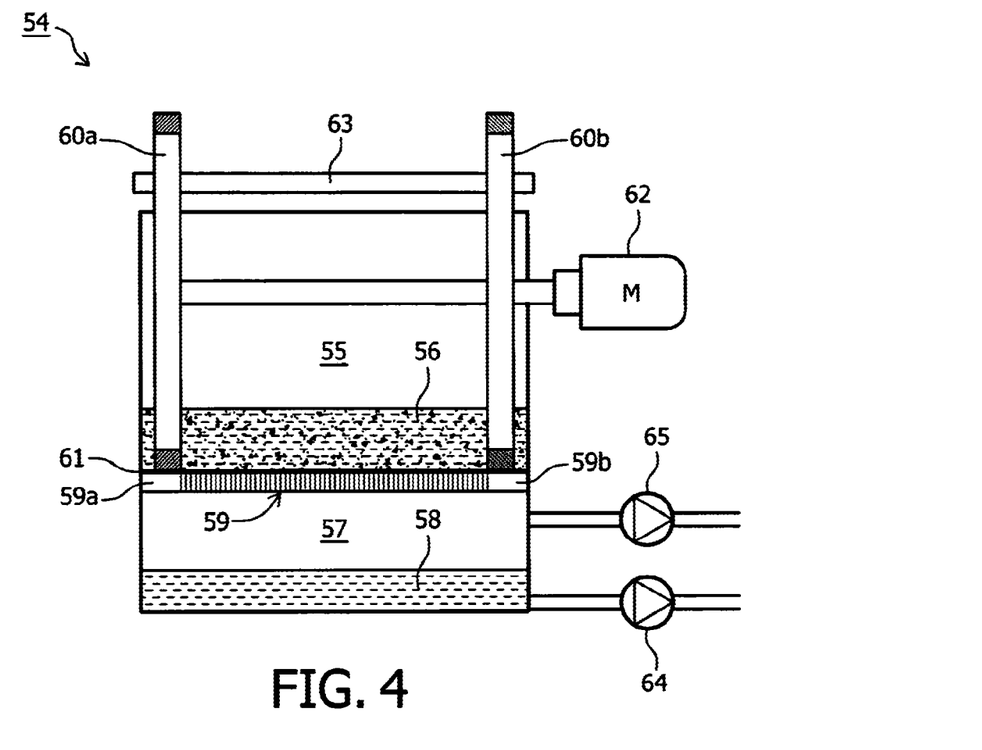
FIG. 4 shows a schematic cross-section of a filter device according to the invention.

FIG. 4 shows a schematic cross-section of a filter device 54 according to the invention. Filter device 54 comprises a first compartment 55 for contaminated water 56 and an underlying second compartment 57 for collecting filtered water 58, wherein a rigid, stationary screen plate 59 is arranged between the two compartments 55, 57. In this embodiment variant the longitudinal edges 59a, 59b do not take a perforated form. This makes it possible to have two transport wheels 60a, 60b engage under bias on longitudinal edges 59a, 59b of screen plate 59, thus clamping and sealing an elongate filter belt 61. The peripheral side of each transport wheel 60a, 60b is provided here with a sealing material, such as an elastomer, whereby damage to filter belt 61, transport wheels 60a, 60b and screen plate 59 can be countered. Transport wheels 60a, 60b can be axially rotated by applying a motor 62. Due to the firm clamping of filter belt 61 between transport wheels 60a, 60b on the one hand and screen plate 59 on the other, rotation of transport wheels 60a, 60b will result in filter belt 61 being pushed forward through first compartment 55. A subsequent pulling movement is realized by applying a guide roller 63 which engages under bias on both transport wheels 60a, 60b and between which filter belt 61 is guided. The filtered water 58 is discharged by using a liquid pump 64 connected to second compartment 57. An underpressure is created in second compartment 57 by using a vacuum pump 65, whereby the filtering process will be accelerated. Owing to the reliable sealing between transport wheels 60a, 60b and screen plate 59 it will be possible to prevent false air being drawn in, and using a vacuum pump 65 with a relatively low power of for instance 0.55 kW a relatively high underpressure in the order of magnitude of 200 mbar can be created. If this sealing in first compartment 55 were to be significantly less good, which would be the case if a conveyor belt were used instead of a stationary screen plate 59, a considerably stronger vacuum pump (about 2 kW) would be necessary to create some degree of underpressure (about 40 mbar). This latter situation will not only result in a higher energy consumption and a lower filtering speed, but will also result in a lower filtering efficiency because not all contaminated liquid will be filtered due to air and contaminated liquid being suctioned in around the outer sides of the filter belt, and (unfiltered) contaminated liquid will enter second compartment 58. The above stated drawbacks can be prevented by applying filter device 54 according to FIG. 4.

It will be apparent that the invention is not limited to the exemplary embodiments shown and described here, but that within the scope of the appended claims a large number of variants are possible which will be self-evident to the skilled person in this field.

The invention claimed is:

1. A filter device for separating a mixture of solid substance and a liquid, comprising:
   a first compartment adapted to hold a mixture of solid substance and a liquid,
   a second compartment positioned at least partially under the first compartment for collecting liquid coming from the first compartment,
   a stationary open support structure which separates the first compartment and the second compartment and which is adapted to support a filter belt displaceable through the first compartment,
   at least one axially rotatable first transport element which engages on the support structure and which is adapted for pushing displacement of the filter belt from a feed side of the support structure in the direction of a discharge side of the support structure by rotating the first transport element and by clamping the filter belt between the first transport element and the support structure,
   at least one axially rotatable second transport element which engages on the first transport element and co-acts with the first transport element, and which is adapted for pulling displacement of the filter belt from the feed side of the support structure in the direction of the discharge side of the support structure by rotating the second transport element and by clamping the filter belt between the first transport element and the second transport element, and
   at least one drive element coupled to at least one transport element for causing axial rotation of the transport elements.

2. The filter device as claimed in claim 1, wherein the first transport element and the second transport element engage on each other under bias.

3. The filter device as claimed in claim 1, wherein the second transport element engages on at least one axially rotatable third transport element.

4. The filter device as claimed in claim 3, wherein the second transport element and the third transport element are adapted for mutual clamping of the filter belt.

5. The filter device as claimed in claim 1, wherein a peripheral side of the first transport element is provided with a substantially liquid-sealing material.

6. The filter device as claimed in claim 1, wherein the filter device comprises a plurality of first transport elements which are oriented co-axially of each other, wherein at least two transport elements are adapted to engage on or close to opposite longitudinal edges of the filter belt.

7. The filter device as claimed in claim 1, wherein the first transport element is formed by a transport wheel.

8. The filter device as claimed in claim 1, wherein the second transport element is formed by a guide roller.

9. The filter device as claimed in claim 8, wherein the diameter of at least one part of the guide roller engaging on the first transport element is smaller than the diameter of a part of the guide roller lying at a distance from the first transport element.

10. The filter device as claimed in claim 1, wherein the width of the second transport element is greater than or equal to the width of the filter belt.

11. The filter device as claimed in claim 1, wherein a peripheral side of the second transport element has an at least partially profiled form.

12. The filter device as claimed in claim 1, wherein the drive element is coupled to the first transport element and wherein the second transport element is driven via the first transport element.

13. The filter device as claimed in claim 1, wherein the support structure takes a curved, substantially semi-circular form.

14. The filter device as claimed in claim 1, wherein the support structure is adapted to at least support opposite longitudinal edges of the filter belt.

15. The filter device as claimed in claim 1, wherein the support structure is embodied as a substantially rigid perforated plate having a number of perforations therein.

16. The filter device as claimed in claim 15, wherein at least some of the number of perforations arranged in the plate take an elongate form in the direction of displacement of the filter belt to be displaced over the plate.

17. The filter device as claimed in claim 15, wherein an upper side of the perforations arranged in the plate and facing toward the filter belt is defined by a rounded edge.

18. The filter device as claimed in claim 15, wherein the perforations are oriented such that the filter belt covers the perforations in operational mode.

19. The filter device as claimed in claim 1, wherein the support structure is mounted releasably in the filter device.

20. The filter device as claimed in claim 1, wherein the second compartment comprises at least one suction element for suctioning filtered water and/or air from the second compartment.

21. The filter device as claimed in claim 20, wherein the second compartment takes a substantially closed form such that an underpressure is created in the second compartment by suctioning filtered water out of the second compartment using the suction element.

22. The filter device as claimed in claim 20, wherein the filter device comprises at least one level sensor for detecting the liquid level in the first compartment and/or the second compartment.

23. The filter device as claimed in claim 22, wherein the level sensor is coupled to the suction element via a control unit.

24. The filter device as claimed in claim 1, wherein the filter device comprises at least one dispensing element for dispensing mixture to the first compartment.

25. The filter device as claimed in claim 1, wherein the filter device comprises at least one supply holder for unused filter belt positioned close to the feed side of the support structure.

26. The filter device as claimed in claim 1, wherein the filter device comprises at least one collecting vessel for used filter belt positioned close to the discharge side of the support structure.

27. The filter device as claimed in claim 1, wherein the filter device is provided with a filter belt.

\* \* \* \* \*